INVENTORS
MATTHEUS J. SCHMITZ &
ANTON F. VAN DER GAAG
BY
Frank R. Trifari
AGENT

INVENTORS
MATTHEUS J. SCHMITZ
ANTON F. VANDERGAAG
BY Frank R. Trifari
AGENT

March 28, 1967 M. J. SCHMITZ ETAL 3,311,883
PLURAL CHANNEL SWITCHING NETWORK WITH
CHECK OF MARKING OF CHANNEL LINK
Filed Dec. 21, 1962 6 Sheets-Sheet 3

INVENTORS
MATTHEUS J. SCHMITZ &
ANTON F. VAN DER GAAG
BY
Frank R. Jerfari
AGENT

INVENTORS
MATTHEUS J. SCHMITZ
ANTON F. VANDER GAAG
BY
[signature]
AGENT

INVENTORS
MATTHEUS J. SCHMITZ
ANTON F. VAN DERGAAG
BY
AGENT

INVENTORS
MATTHEUS J. SCHMITZ &
ANTON F. VAN DER GAAG
BY
Frank R. Trifari
AGENT

United States Patent Office 3,311,883

Patented Mar. 28, 1967

3,311,883

PLURAL CHANNEL SWITCHING NETWORK WITH CHECK OF MARKING OF CHANNEL LINK

Mattheus Jacobus Schmitz, Hilversum, and Anton Ferdinand van der Gaag, Emmasingel, Eindhoven, Netherlands, assignors to North American Philips Company, Inc., New York, N.Y., a corporation of Delaware Filed Dec. 21, 1962, Ser. No. 246,495

Claims priority, application Netherlands, Dec. 29, 1961, 273,091

8 Claims. (Cl. 340—166)

The invention relates to a switching network composed of switching matrices, having a circuit for marking a channel, each channel of this switching network being identifiable by an address of a number of co-ordinates, the first $p$ of which ($p \geqq 1$) identifies the input concerned of the switching network, the $(p+1)$th of which fixes the switching operation in the first switching stage, the $$(p+2)\text{th}$$

fixes the switching operation in the second switching stage, and so on. The switching network comprises a number of marking wires, each of which corresponds to a given value of one of the aforesaid co-ordinates with the exception of the first $p$ and is connected to all crossings of the switching stage concerned, where channels pass, for which the coordinate concerned has the value concerned. The assembly is arranged so that each link of the switching network always has a detectable electric property, which indicates whether this link is free, busy or is just marked. Such a switching network is known, inter alia, from German patent specification 1,034,221. There is, however, a need for checking the composition of a channel in the switching network preferably step by step. In accordance with the invention this is achieved by connecting the links between each pair of successive switching stages to a checking member which detects whether among these links there is a link which is just marked or whether there is not such a link.

The invention will be described more fully with reference to the drawing.

Figure 1:
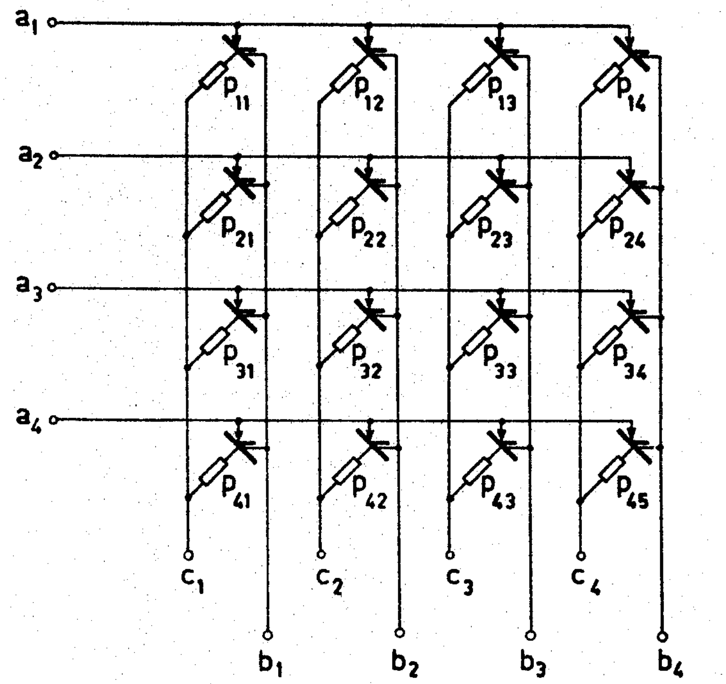
FIG. 1 shows the principal diagram of a switching matrix suitable for composing a switching network according to the invention.
Figure 2:
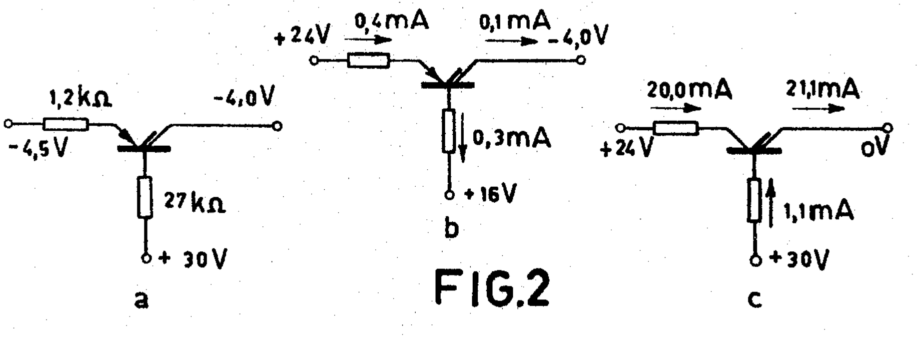
FIG. 2 shows the voltages at the electrodes of the pnpn-transistors used in the switching matrix of FIG. 1 as crossings in the rest position (FIG. 2$a$) during the marking process (FIG. 2$b$), and in the busy or conductive state (FIG. 2$c$).
Figure 3:
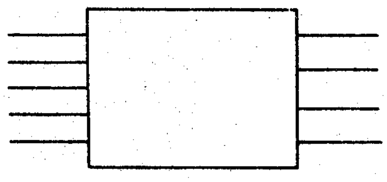
FIG. 3 illustrates diagrammatically the symbols commonly used for a switching matrix.

FIG. 1 shows a switching matrix suitable for use in a switching network having the required properties. In this figure $a_1$, $a_2$, $a_3$, $a_4$ designate a set of input wires, $b_1$, $b_2$, $b_3$, $b_4$ a set of output wires, and $c_1$, $c_2$, $c_3$, $c_4$ a set of marking wires. The input wire $a_i$ is connected via a gate $p_{ij}$ to the output wire $b_j$ ($i, j=1, 2, 3, 4$). The marking wire ($c_k$) ($k=1, 2, 3, 4$) is connected to the control-terminals of the gates $p_{1k}$, $p_{2k}$, $p_{3k}$ and $p_{4k}$. Each gate comprises a transistor having a current amplification factor exceeding 1, for example a pnpn-transistor, the emitter of which constitutes the input and is connected to the $a$-wire concerned and the collector of which constitutes the output wire and is connected to the $b$-wire concerned, whereas the base is connected via a resistor to the $c$-wire concerned. The end of this resistor remote from the base constitutes the control-terminal of the gate. In the rest position of the switching matrix all input wires $a_i$ have a voltage of −4.5 v., all output wires $b_j$ a voltage of −4.0 v. and all marking wires a voltage of +30 v. Each transistor is then in the state indicated in FIG. 2$a$ and is blocked. If the input wire $a_i$ must be connected to the output wire $b_j$, the voltage of the input wire $a_i$ is raised to +24 v. and the voltage of the marking wire $c_{5k}$ is reduced to +16 v. The transistor thus arrives in the state indicated in FIG. 2$b$ and becomes conductive. A peculiarity of this circuit arrangement is that, even after the marking voltage of +16 v. has disappeared, the transistor remains conducting and hence also when the marking wires have reassumed a voltage of +30 v. The latter is due to the voltage difference produced by the base current across the resistor in the base circuit of the transistor. The transistor even remains conducting, when the voltage of the output wire $b_j$ is raised to about 20 v., which may indeed be the case, as will be described hereinafter, during the marking process. Finally the transistor arrives in the state indicated in FIG. 2$c$. FIG. 3 shows the symbols used in the circuit diagrams for the switching matrix.

Figure 4:
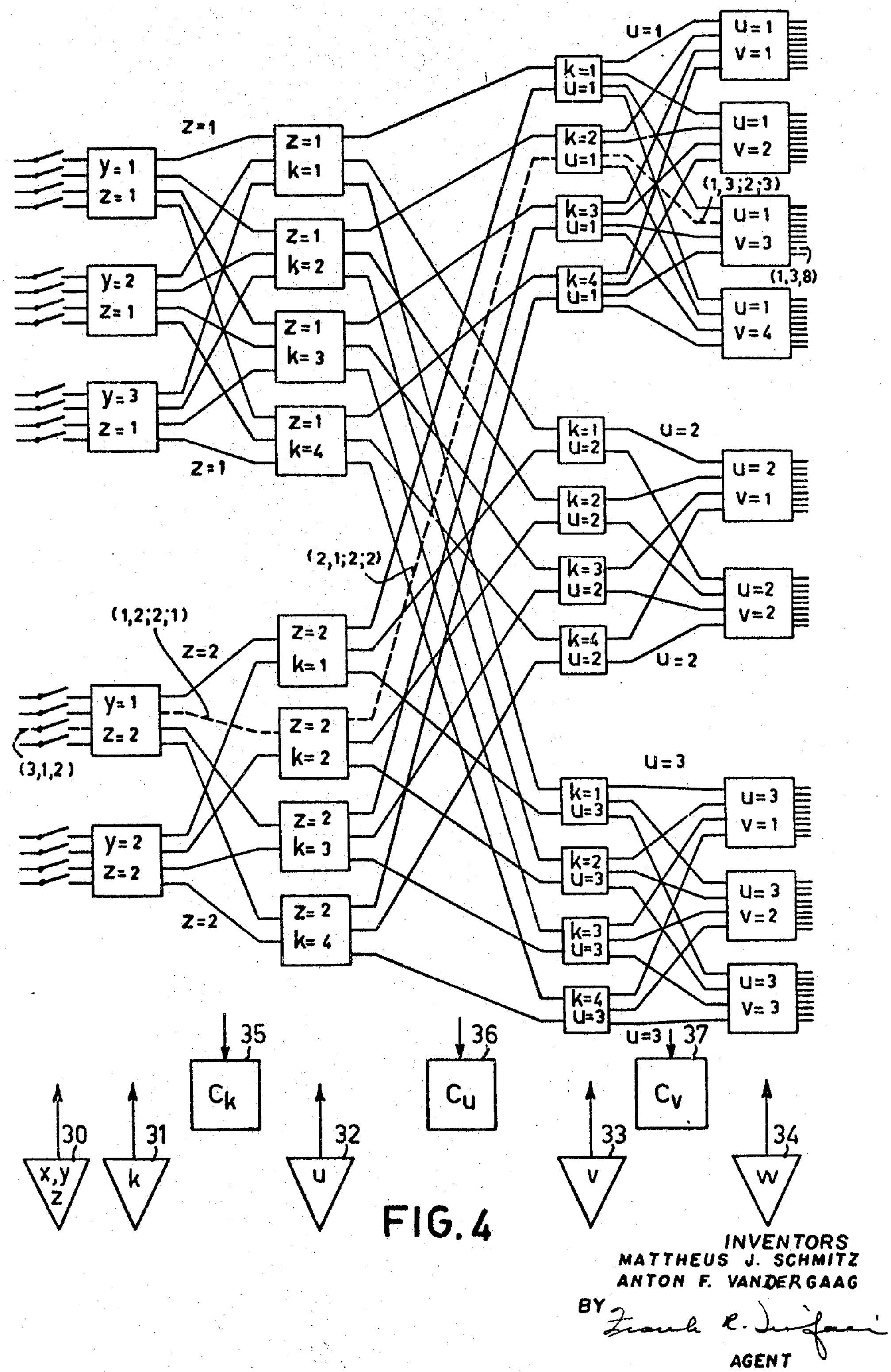
FIG. 4 shows the principle of the interconnection of the switching matrices in a switching network according to the invention and the adjusting and checking members of said switching network.

FIG. 4 shows the principle of the method in which the switching matrices of FIG. 1 may be connected in a large switching network. This switching network comprises four switching stages, i.e. the A-stage, the B-stage, the C-stage and the D-stage respectively. The switching matrices forming together the A-stage are termed the A-switches. The switches of the B-, C- and D-stages, are designated in the same manner. The A- and B-switches are arranged in two AB-groups. The first AB-group comprises 3 A-switches and 4 B-switches, the second AB-group comprises 2 A-switches and 4 B-switches. The C- and D-switches are arranged in three CD-groups. The first CD-group comprises 4 C-switches and 4 D-switches, the second CD-group comprises 4 C-switches and 2 D-switches, the third CD-group comprises 4 C-switches and 3 D-switches. Each AB-group is indicated by a co-ordinate $z$. For the first AB-group $z=1$ and for the second AB-group $z=2$. Each CD-group is indicated by a co-ordinate $u$: for the first CD-group $u=1$, for the second CD-group $u=2$, for the third CD-group $u=3$. Each A-switch can be indicated by two co-ordinates $y$ and $z$. The A-switch $A_{yz}$ is then the $y$th A-switch of the $z$th AB-group. Each D-switch is indicated by two co-ordinates $u$ and $v$, whilst $D_{uv}$ is the $v$th D-switch of the $u$th CD-group. The B- and C-switches are indicated by two co-ordinates $z$, $k$ and $u$, $k$ respectively, and $B_{zk}$ is the $k$th B-switch of the $z$th AB-group and $C_{uk}$ is the $k$th C-switch of the $u$th CD-group. The reason why a common co-ordinate $k$ is used for the B- and C-switches and the meaning of said co-ordinate will be explained hereinafter. Each input of the switching network is indicated by a triple ($x$, $y$, $z$) of co-ordinates, the input ($xyz$) being the $x$th input of the $y$th A-switch of the $z$th AB-group. Each output of the switching network is indicated by a triple ($u$, $v$, $w$) of co-ordinates, the output ($uvw$) being the $w$th output of the $v$th D-switch of the $u$th CD-group. The connecting wires between each A-switch and each B-switch are termed AB-links, the connecting wires between each B-switch and a C-switch are termed BC-links and the connecting wires between each C-switch and each D-switch are termed CD-links. The so-called link pattern of the switching network shown in FIG. 4 is the following; the $k$th output of the $y$th A-switch of the $z$th AB-group is connected to the $y$th input of the $k$th B-switch of the $z$th AB-group. An AB-link can therefore be indicated by a quadruple ($y$, $z$; $k$; 1) of co-ordinates, of which the first $y$ indicates the A-switch within the relevant AB-group, from which the AB-link starts, the second $z$ indicates the AB-group within the AB-link is located, the third $k$ indicates the B-switch within the relevant AB-group, to which the AB-link goes and the fourth is the co-ordinate 1, which indicates that the link is an AB-link. The $u$th output of the $k$th B-switch of the $z$th AB-group is connected to the $z$th input of the $k$th C-switch of the $u$th CD-group. A BC-link can therefore be indicated by a quadruple ($z$, $u$; $k$; 2) of co-ordinates, of which the first $z$ indicates from which AB-group the BC-link starts, the second $u$ indicates to which CD-group the BC-link leads, the third $k$ indicates between which B- and C-switches of the relevant AB- and CD-groups the BC-link extends and the fourth is the co-ordinate 2, which indicates that the link is a BC-link. The $v$th output of the $k$th C-switch of the $u$th CD-group is connected to the $k$th input of the $v$th D-switch of the $u$th CD-group. A CD-link can therefore be indicated by a quadruple ($u$, $v$; $k$; 3) of co-ordinates, of which the first $u$ indicates the CD-group within which the CD-link extends, the second $v$ indicates the D-switch within the CD-group, to which the CD-link leads, the third $k$ indicates the C-switch within this CD-group, from which the CD-link starts and the fourth is the co-ordinate 3, which indicates that the link is a CD-link. This switching pattern requires that the AB-groups should all of them comprise the same number of B-switches and the CD-groups should comprise, all of them, the same number of C-switches, said number (4 in the switching network shown in FIG. 4) being equal to the number of potential values of the co-ordinate $k$. Each B-switch has a number of outputs equal to the number of CD-groups and each C-switch has a number of inputs equal to the number of AB-groups. Similar relations exist between the number of outputs of the A-switches and of inputs of the B-switches and the number of outputs of the C-switches and of inputs of the D-switches. In the switching network shown a certain irregularity is introduced, on purpose, in order to show clearly the general principle of the link pattern. The generalisation may be further increased by replacing each link by $q$ parallel links. A further generalisation, which may, if desired, be used in conjunction with the aforesaid generalisation, consists in that pairs of switching matrices of the same switching stage are united each time to form a larger switching matrix. The latter generalisation comes down to a certain degree of mixing and has therefore the inherent advantage, i.e. a reduction of the risk of stagnation and an increase in efficiency of given links.

Referring to the link pattern shown in FIG. 4, it will be seen that between each arbitrary input ($x$, $y$, $z$) and each arbitrary output ($u$, $v$, $w$) of the switching network a number of channels may be built up, each of them passing by a different B-switch and hence also by a different C-switch. Therefore, these channels can be distinguished from each other by the co-ordinate $k$, for which reason the co-ordinate $k$ is termed the channel number. A set of links forming in common a channel from the input ($x$, $y$, $z$) to the output ($u$, $v$, $w$) has the n-tiple of co-ordinates ($y$, $z$; $k$; 1), ($z$, $u$; $k$; 2), ($u$, $v$; $k$; 3), of which the co-ordinates $y$, $z$, $u$ and $v$ are determined by the relevant input and output, whilst the co-ordinate $k$ may have any of the values 1, 2, 3 or 4, it having, however, the same value for four links forming in common a channel. Between each incut and each output there are consequently four potential channels, from which a choice is to be made.

In the event each link of the switching network of FIG. 4 is replaced by e.g. three parallel links, a fifth co-ordinate $l$ must be introduced, which may assume any of the values 1, 2 or 3. The AB-links can then be indicated by the n-tiples of co-ordinates ($y$, $z$; $k$, $l$; 1), whereas for the BC- and the CD-link a similar addressing may be introduced. Three links forming in common a channel must then have the addresses ($y$, $z$; $k$, $l$ 1), ($z$, $u$; $k$, $l$ 2) and ($u$, $v$; $k$, $l$ 3), in which $k$ must have the same value for the three links. For the co-ordinate $l$ this is not required, but it is desirable, since unequality of the co-ordinates $l$ of three links forming in common a channel does not lead to an increase in the number of channels. If $k$ can assume any of the values 1, 2 . . . $p$ and $l$ can assume each of the values 1, 2 . . . $q$, there are $pq$ potential channels between each arbitrary input and each arbitrary output.

In a switching network having a greater or smaller degree of mixing in the B- or C-stages other complications arise, which may be solved, however, without difficulty.

Figure 5:
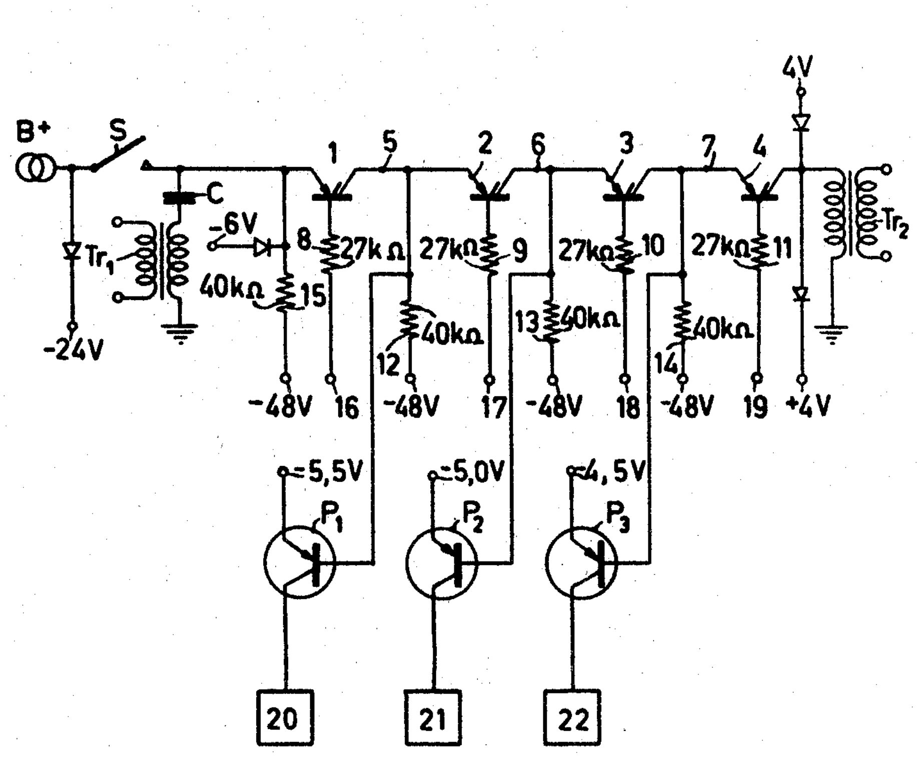
FIG. 5 shows a detail of the diagram of the switching network according to the invention and the manner in which it is marked.

FIG. 5 shows in detail the members which comprise a single channel in the network of FIG. 4, according to the invention. The input of the channel is connected via a switch S to the output terminal of a current source B+, said terminal being connected, in addition, via a diode to a voltage source of +24 v. The output terminal of a current source B+ is thus held at a voltage of +24 v. The input of the channel is furthermore connected via a capacitor C to a winding of a transformer $Tr_1$. This transformer is capable of injecting a signal into the channel or of withdrawing a signal from the channel. Finally, the input of the channel is connected via a resistor 15 to a voltage source of −48 v. and via a diode to a voltage source of −6 v. Thus the input of the channel has, when the switch S is open, a voltage of −6 v. and, when the switch S is closed, a voltage of +24 v.

The output of the channel is connected via a winding of a second transformer $Tr_2$ to earth and via two diodes to voltage sources having voltages of −4 v. and +4 v. Thus the voltage of the output always lies between −4 v. and +4 v. The transformer $Tr_2$ permits the injection of a signal into the channel or the deriving a signal from the channel.

The channel extends via transistors 1, 2, 3 and 4 and via the links 5, 6 and 7. The links 5, 6 and 7 thus correspond to separate links AB, BC and CD respectively of the network of FIG. 4, and the transistors 1, 2, 3 and 4 correspond to individual transistor switches in the matrices of A, B, C and D switches respectively in the network of FIG. 4. The switch S corresponds to one of the input switches of the system of FIG. 4. The marking terminals 16, 17, 18 and 19 are marking terminals of the corresponding switches and may, for example, be the marking terminals $c$ of matrices of the type shown in FIG. 1. The base of the transistor 1 is connected via a resistor 8 to a marking terminal 16. In a similar manner the bases of the transistors 2, 3 and 4 are connected via a resistor 9, 10 and 11 respectively to a marking terminal 17, 18 and 19 respectively. The AB-link 5 is connected via a resistor 12 to a voltage source of −48 v., the BC-link 6 is connected via a resistor 13 to a voltage source of −48 v. and the CD-link 7 is connected via a resistor 14 to a voltage source of −48 v. The AB-link 5, is connected, in addition, to the base of a pnp-transistor $P_1$, the emitter of which is connected to a voltage source of −5.5 v. The BC-link 6 is connected to the base of a pnp-transistor $P_2$, the emitter of which is connected to a voltage source of −5.0 v. The CB-link 7 is connected to the base of a pnp-transistor $P_3$, the emitter of which is connected to a voltage source of −4.5 v. Leaving the circuits connected to the collectors of said transistors provisionally out of consideration, said transistors may be considered to be diodes.

The composition or marking of the channel is performed as follows. Initially the switch S is open and the marking terminals 16, 17, 18 and 19 have a voltage of +30 v. The emitter of the transistor 1 has a voltage of −6 v., that of the transistor 2 a voltage of −5.5 v. and that of the transistor 3 a voltage of −5 v. and that of the transistor 4 a voltage of −4.5 v. Between the emitter and the base of each of the four transistors 1, 2, 3 and 4 there prevails a voltage which blocks them. In order to build up the channel the switch S is closed and the voltage of the marking terminals 16, 17, 18 and 19 is reduced to +16 v. Thus the voltage at the emitter of the transistor 1 rises to +24 v. and the voltage at the base of said transistor drops to +16 v. The transistor 1 thus becomes conductive. This results, however, in that the voltage of +24 v. propagates up to the emitter of the transistor 2, which thus also becomes conductive. This again results in that the voltage of +24 v. arrives at the emitter of the transistor 3, which thus becomes also conductive. Then the voltage of +24 v. continues up to the emitter of the transistor 4, which also becomes conductive. Since the collector of the last-mentioned transistor is connected via the low resistance of the winding of the transformer $Tr_2$ to earth, the voltage of the whole channel between the input and the output thereof will drop to about zero volt. For the reason already set out with reference to FIGS. 1 and 2 the transistors 1, 2, 3 and 4 remain conductive, even if afterwards the voltage at the marking terminals 16, 17, 18 and 19 is again raised to +30 v. The channel is broken down by opening the switch S. Then all transistors are driven back into the non-conductive state. By applying the AB-link 5, the BC-link 6 and the CD-link 7 to −5.5 v., −5.0 v. and −4.5 v. respectively, it is ensured that the collectors of each of the transistors 1, 2, 3 and 4 have a slightly higher voltage than the emitters, so that opening of the switch S results with certainty in blocking of these transistors. Without said measure these transistors could remain conductive owing to leakage currents via the transistors multipled thereto in the switching matrix, in spite of the opening of the switch S, or in other words, a channel once built up could no longer be broken down. It therefore appears that, in the free state, a link has a voltage of −5.5 v., −5.0 v. or −4.5 v., during the marking process transiently a voltage of 24 v. and in the busy state a voltage of about zero volt so that the condition applied to the links as stated above is fulfilled. It will furthermore be readily understood that a reduction of the voltage from 30 v. to 16 v. at a marking terminal, which is connected to the base of a transistor rendered conductive at an earlier instant, does not exert or hardly exerts any influence on the channel extending via said transistor. This reduction of the voltage at a marking terminal has no effect on a transistor, the emitter of which is not at a voltage of nearly 24 v., i.e. a voltage of −6.0 v., −5.5 v., −5.0 v. or −4.5 v. Only a transistor which is connected via a part of the channel already built up to a closed switch S, can pass from the non-conductive state into the conductive state, or in other terms, double marking cannot occur. Each transistor of the switching network can be marked by the coincidence of a marking from the input of the switching network by closing the switch S via a built-up part of a channel up to the relevant transistor and a marking from a marking wire connected to the base of said transistor. This provides a very great simplification of the marking system of the switching network.

The collector of the transistor $P_1$ is connected to a circuit 20, the collector of the transistor $P_2$ to a circuit 21 and the collector of the transistor $P_3$ to a circuit 22. The link 5 has, in the busy state, a voltage of about zero volt, so that the transistor $P_1$ is then non-conductive. In the free state the link 5 obtains a negative voltage, since it is connected via the resistor 12 to a voltage source of −48 v., said negative voltage rendering the transistor $P_1$ conducting, so that the voltage at the link 5 is stabilised at about −5.5 v. The circuit 20 is arranged so that it indicates whether the transistor $P_1$ is conducting or non-conducting, i.e. whether the link 5 is free or busy. The circuits 21 and 22 fulfil similar functions with respect to the links 6 and 7.

Referring to FIG. 4 it should be noted that the adjustment of the switching network is performed by means of five adjusting members 30, 31, 32, 33, 34, which are illustrated in FIG. 4 diagrammatically in the form of contact pyramids. The function of these adjusting members will be understood in a simple manner with reference to an example. It is assumed that a channel must be formed between the input (3, 1, 2) and the output (1, 3, 8) with the channel number 2. In FIG. 4 this channel is shown for the sake of clarity by a thick broken line. It passes via the links (1, 2; 2; 1), (2, 1; 2; 2) and (1, 3; 2; 3). The adjusting member 30 has a number of outputs equal to the number of switches S and receives from a control-member, or the operator, information about the co-ordinates $x$, $y$, and $z$. Each output of the control-member 30 is connected to a control-terminal of one of the switches S. When the control-member 30 has received information about the values of the three co-ordinates $x$, $y$ and $z$, said output of the control-member 30 is energized, which is connected to the control-terminal of the switch S connected to the input $(x, y, z)$, which results in that said switch is closed. The adjusting member 30 is consequently essentially a translator, which converts an input information supplied in some code into a 1-out-of-n-code and which may therefore be constructed by known principles.

The adjusting member 31 has a number of outputs equal to the potential values of the channel number and receives as an input information the value of the channel number. In the example chosen this is the value $k=2$. Owing to the reception of this information the output corresponding to the value $k=2$ is energized, which means in this case that the voltage of said output is lowered from 30 v. to 16 v. This output is connected to the base of each pnpn-transistor of each A-switch, which leads to an AB-link, the channel number of which has the value 2. In FIG. 4 these are therefore the links (1, 1; 2; 1), (2, 1; 2; 1), (3, 1; 2; 1) and (1, 2; 2; 1) and (2, 2; 2; 1). For the reason set out above, however only that transistor of all transistors becomes conducting which connects the input (3, 1, 2) to the link (1, 2; 2; 1). Also the adjusting member 31 is therefore essentially a translator, which converts the information at the input into a 1-out-of-n-code and which may therefore be constructed according to known principles.

The adjusting member 32 has a number of outputs equal to the different potential values of the co-ordinate $u$ and receives as an input information the value of said co-ordinate. In the chosen example this is the value $u=1$. By the reception of this information the output corresponding to the value $u=1$ is energized, which means in this case that the voltage at this output is reduced from 30 v. to 16 v. This output is connected to the base of each pnpn-transistor of each B-switch, which leads to a BC-link, the co-ordinate $u$ of which has the value 1. In FIG. 4 these are the links (1, 1; 1; 2), (2, 1; 1; 2), (1, 1; 2; 2), (2, 1; 2; 2), (1, 1; 3; 2), (2, 1; 3; 2), (1, 1; 4; 2) and (2, 1; 4; 2). For the reason set out above, only that transistor of all these transistors becomes conducting, which is connected via an AB-link to the input (3, 1, 2). In the example given this is the transistor which connects the AB-link (1, 2; 2; 1) to the BC-link (2, 1; 2; 2). The adjusting member 32 is again essentially a translator, which converts the input information code into a 1-out-of-n-code and which may therefore be built along known principles.

The adjusting members 33 and 34 have an analogous function and may be constructed in a similar manner.

As stated above, it is desirable to check the formation of channels in the switching network as far as possible with respect to errors. To this end it is in the first place necessary to check the various carriers of information between members of exchanges with respect to errors.

However, this check is beyond the subject-matter of the present application and may be carried out inter alia in the manner described in German patent specification 1,093,411. The adjusting members 30, 31, 32, 33 and 34 may be rendered self-checking to a greater or smaller degree, for example, by checking whether one output of an energized adjusting member is energized instead of more outputs or fewer outputs. A still more effective check is obtained by re-translating the information appearing at the outputs of an adjusting member into the code used for the input information and by comparing the result of this re-translation with the input information. Also these checking operations are beyond the subject-matter of the present application.

The check according to the invention is carried out by means of the checking members 35, 36 and 37. These members check the correct operation of the switching network itself. Use is made in this case of the fact that during the marking operation a link has a voltage characteristic of the marking state. In the switching network described by way of example this voltage amounts to about 24 v. and has only a very short duration. Since the checking members had to be unnecessarily complicated, if they should respond to the marking voltage of extremely short duration, it is more practical to build up a channel stepwise. First the adjusting member 30 is energized, so that the switch S concerned is closed. In the case referred to by way of example this is the switch which is connected to the input (3, 1, 2). However, this must provisionally not have any further effect. The checking member 35, in particular, must not state a marking voltage at an AB-link. Not until this is assessed and the A-switch $A_{02}$ does not include a broken-down transistor, the adjusting member 31 is energized. This must result in that the link (1, 2; 2; 1) assumes the marking voltage, but none of the further links. The checking member may therefore be connected to all AB-links and be constructed so that it checks whether just one AB-link has assumed the marking voltage. This is illustrated diagrammatically in FIG. 6. A complete check, which provides at the same time a check of the correct functioning of the adjusting member 31, is illustrated diagrammatically in FIG. 7. The checking member 35 has in this case a number of inputs equal to the number of different potential values of the channel, while each of said inputs is connected to all AB-links, for which the channel number has the value joined to said inputs. If the checking member 35 receives in this case the value of the channel number as an input information, it can be assessed not only that one of the AB-links has assumed marking voltage but also whether this AB-link has the correct channel number.

Not until the checking member 35 (FIG. 4) has assessed that the switching process has been achieved without errors in the A-stage the adjusting member 32 is energized. By means of the checking member 36 it is checked whether also the switching operation in the B-stage has been performed correctly. This check may be carried out in accordance with the same principles as the check performed by means of the checking member 35, and it need therefore not be described more fully.

When the checking member 36 has stated that the switching operation in the B-stage has been correctly performed, the adjusting member 33 is energized. By means of the checking member 37 it is checked whether the switching operation in the C-stage has been performed without errors, said check being performed in the same manner as that of the switching operations in the A and B-stages.

When the checking member 37 has stated that the switching operation in the C-stage has been carried out without errors, the adjusting member 34 is energized, so that the switching operation is performed in the D-stage. In principle, the switching operation in the D-stage could be performed in an analogous manner as with the switching operations in the preceding switching stages, but said check cannot be related to the occurrence of a given marking voltage; it must respond for example to the presence or the absence of a current. However, it is more practical to perform the switching operation in the D-stage on the basis of other principles, which are not related to the present invention and may therefore be left out of consideration.

Figure 8:
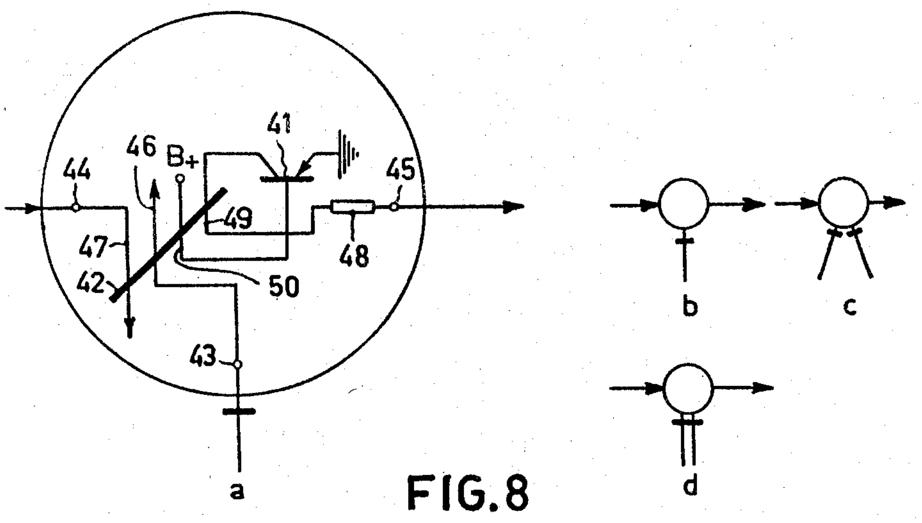
FIG. 8 shows the diagram of a very practical assembly unit (pulse generator with storage) for constructing logic circuit arrangements.

FIG. 8 shows a very practical assembly unit for the various members of the arangement according to the invention. These assembly units are termed storage pulse generators. The assembly unit comprises mainly a pnp-transistor 41 and an annular core 42 of a material having a rectangular hysteresis loop. The pulse generator furthermore comprises an adjusting terminal 43, a firing terminal 44 and an output terminal 45. The adjusting terminal 43 is connected to an adjusting winding 46 of the ring 42. The firing terminal 44 is connected to a firing winding 47. The output terminal 45 is connected via a current-determining resistor 48 in series with a feedback winding 49 of the ring 42 to the collector of the transistor 41. The emitter of this transistor is earthed. The base of the transistor is connected via a control-winding 50 of the ring 42 to a positive voltage source B+. In FIG. 8*a* all windings are shown as one-turn windings, i.e. as wires threaded through the ring. This has the advantage that the sense of winding can be directly seen. In reality it may be convenient or necessary to provide more than one turn for each winding.

The arrangement operates as follows. Normally the transistor 41 is held non-conducting by the voltage source B+. When a pulse of adequate intensity and duration is applied to the adjusting terminal 43, the ring 42 is changed over to a magnetic state which is termed the state 1. The pulse generator is then adjusted. During the adjustment a voltage is induced into the control-winding 50, said voltage rendering the base of the transistor 41 further positive than it had been made by the positive voltage source B+, so that during the adjustment the transistor remains non-conducting. This is not changed by the fact that the collector of the transistor is made slightly negative by the voltage induced into the feedback winding 49. If, in the adjusted state of the pulse generator, a pulse is led to the firing terminal 44, said pulse having adequate intensity to change over the ring 42 to the steep part of its characteristic curve, a voltage is induced into the control-winding 50, this voltage overcoming the voltage of the voltage source B+ and rendering the base of the transistor negative. The transistor thus becomes conducting, so that a current will flow through the feedback winding 49 and amplifies the effect of the firing terminal and may take over this function. This results in that the ring 42, even if the firing pulse had terminated earlier, is completely driven into the state 0 and the pulse generator supplies an output pulse having a sharply defined duration and amplitude, which are substantially independent of the duration and the amplitude of the firing pulse. Only in the adjusted state of the pulse generator, this generator is capable of furnishing an output pulse. Firing of a previously non-adjusted pulse generator has no effect.

FIG. 8*b* shows the symbols used in diagrams for a storing pulse generator. It will furthermore be seen that a storing pulse generator may also have two adjusting windings. In this case the assembly may be arranged so that the pulse generator can be adjusted by applying an adjusting pulse to one of the two adjusting terminals, either to one or to the other, but it may also be arranged so that the pulse generator can be adjusted only by applying simultaneously two adjusting pulses to the two adjusting terminals. In the first case the adjusting terminals are said to be non-coupled and are indicated by the symbol of FIG. 8*c*. In the second case the adjusting terminals are said to be coupled and are designated by the symbol of FIG. 8*d*. In the latter case the operation is termed an adjustment, by coincidence.

As a matter of course, the pulse generator may have two or more firing windings, which are, however, always non coupled.

Figures 6, 7:
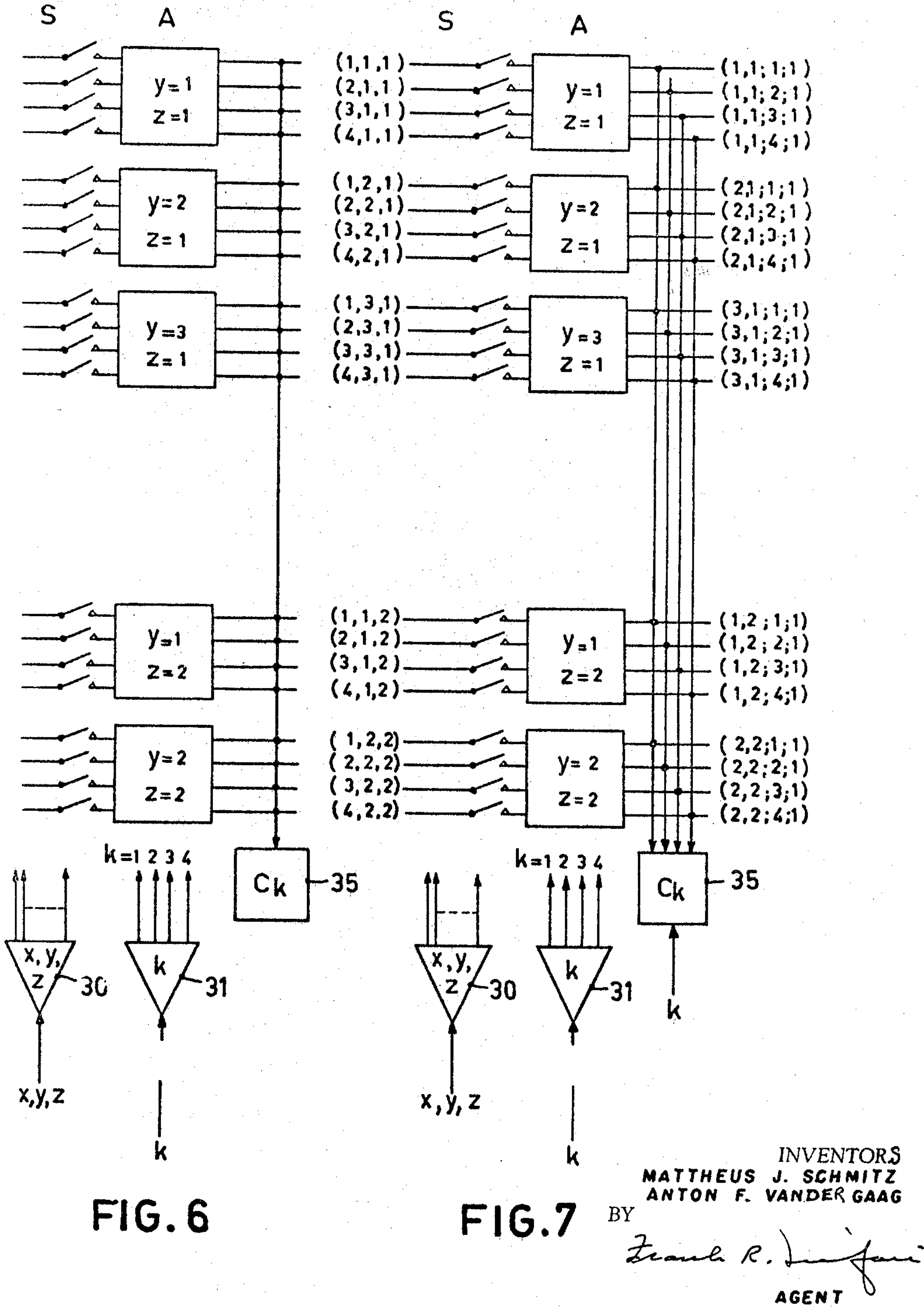
FIGS. 6 and 7 illustrate two methods of application of the principle of the checking of the composition of a channel in the switching network as illustrated in FIG. 4.
Figure 9:
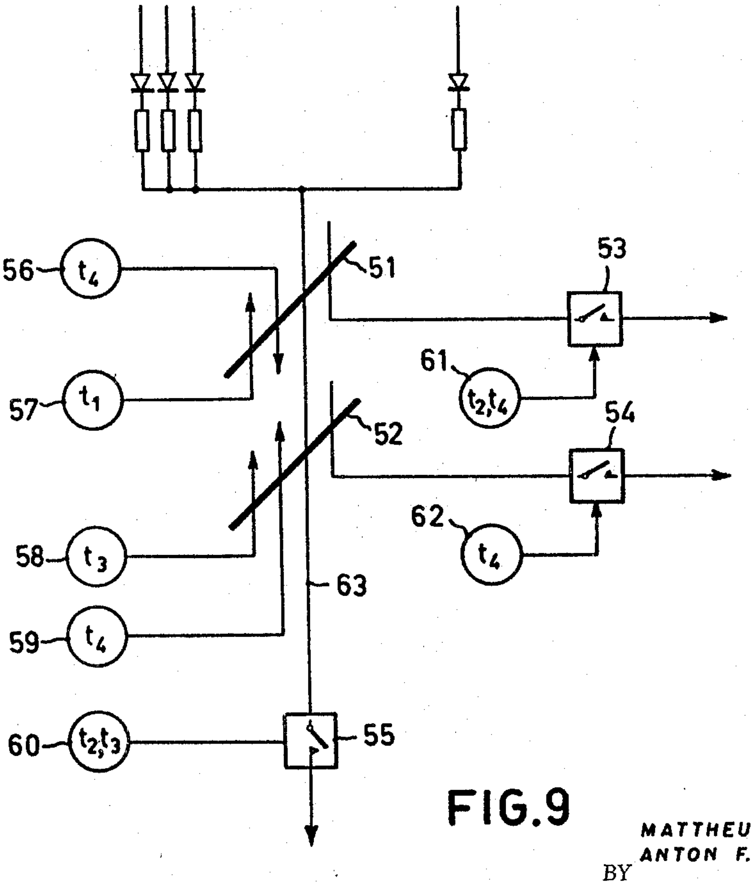
FIGS. 9 and 10 show the diagram of two checking members embodying the invention.

FIG. 9 shows a possible embodiment of the checking member 35, if the check is performed according to the principle shown in FIG. 6. The arrangement comprises mainly two preferably annular cores 51 and 52 of a material having a rectangular hysteresis loop and three controllable gates 53, 54 and 55. The AB-links are connected each via a decoupling diode and a current-determining resistor to a wire 63, which is threaded through the two rings 51 and 52 and is connected to the input of the gate 55. This gate is normally closed, but it is opened for the duration of one pulse at the instants $t_2$ and $t_3$ of each pulse cycle. The ring 51 has two windings, which are connected to pulse sources 56 and 57. These pulse sources provide a clock pulse at the instants $t_4$ and $t_1$ respectively of each pulse cycle. The ring 51 has furthermore a winding which is connected to the input of the gate 53. This gate is normally closed, but it is opened at the instants $t_2$ and $t_4$ of each pulse cycle for the duration of one pulse by the clock pulses furnished by a pulse source 61. The ring 52 has two windings, which are connected to pulse sources 58 and 59. These pulse sources supply at the instants $t_3$ and $t_4$ respectively of each pulse cycle a clock pulse. The ring 52 has furthermore a winding which is connected to the input of the gate 54. This gate is normally closed, but it is opened at the instant $t_4$ of each pulse cycle for the duration of one pulse by the clock pulses supplied by a pulse-source 62. The senses of winding of the various windings can be directly seen from the drawing.

In FIG. 9 it is assumed that the clock pulses are supplied from separate pulse sources. In reality these pulses are usually furnished by a clock-pulse distributor, which is controlled by a stabilized clock-pulse generator.

It will be assumed that the formation of a channel in the switching network starts in that first only the adjusting member 31 supplies a negative marking pulse at its output indicated by the control member at the instant $t_3$ of a pulse cycle. Thus one of the pnpn-transistors of the A-stage becomes transiently conducting, so that a pulse of 24 v. occurs at one of the AB-links, which results in the occurrence of a current pulse across the wire 63.

The arrangement operates as follows: At the instant $t_4$ of the pulse cycle preceding the pulse cycle in which the marking takes place the ring 51 is changed over to the magnetic state, which is termed the state 0 and the ring 52 is changed over to the magnetic state, which is termed the state 1. At the instant $t_1$ of the pulse cycle in which the marking occurs, the ring 51 is changed over to the state 1, so that the two rings are then in the state 1. At the instant $t_2$ the gate 55 is opened for a short instant, but, if the operation is performed correctly, this has no effect. The ring 51, in particular, is not changed over and there is no pulse induced into the wire connected to the gate 53. At the instant $t_3$ the gate 55 is again opened for a short instant. If the operation is performed correctly, the wire 63 conveys a current pulse so that the ring 51 leaps to the state 0. The ring 52 remains, however, in the state 1, since the effect of the current pulse across the wire 63 on said ring is completely neutralized by the pulse across the winding connected to the pulse source 58, which then just furnishes a clock-pulse. At the instant $t_4$ the ring 51 is driven to the state 0, in which it already was and the ring 52 is driven to the state 1, in which it also already was. Neither of the two rings 51 and 52 is changed over and no pulse is induced in neither of the two windings connected to the gates 53 and 54. Consequently, the gates 53 and 54 do not furnish an output pulse.

The normal operation described above may be changed to an abnormal operation by the following causes:

(1) One of the pnpn-transistors of the A-stage has broken down; if the pulses supplied by the pulse source 57 have adequate intensity, the ring 51 is changed over to the state 1 at the instant $t_1$, in spite of the direct current across the wire 63, but immediately at the termination of the pulse supplied by the pulse source 57 the ring 51 changes back to the state 0, so that a pulse is induced into the winding connected to the gate 53; this pulse passes through the gate 53, which is then open; the ring 52 remains permanently in the state 0, so that with this disturbance no pulses are induced into the winding connected to the gate 54;

(2) None of the pnpn-transistors of the A-stage becomes non-conducting; in this case the wire 56 does not convey a current pulse at the instant $t_3$; the ring 51 is changed over to the state 0 at the instant $t_4$ instead of the instant $t_3$; the gate connected to the gate 53 thus has, with this disturbance, a pulse at the instant $t_4$, this pulse passing through said gate. The ring 52 remains, as in the normal case, permanently in the state 1;

(3) Instead of one, two pnpn-transistors of the A-stage become conducting; this does not change the change-over of the ring 51, but the ring 52 changes over from the state 1 to the state 0 at the instant $t_3$ by this disturbance and changes over from the state 0 to the state 1 at the instant $t_4$, so that at the instant $t_4$ a pulse is induced into the winding connected to the gate 54, this pulse passing through said gate.

In the following table the four cases are summarized:

| | 53 | 54 |
|---|---|---|
| One transistor becomes conducting | (Normal) | ------ |
| One transistor has broken down | $t_2$ | ------ |
| None of the transistors becomes conducting | $t_4$ | ------ |
| Two transistors become conducting | ---------- | $t^4$ |

The arrangement is therefore capable of discriminating between the normal or disturbance-free operation of the switching network and the three aforesaid kinds of disturbances.

Figure 10:
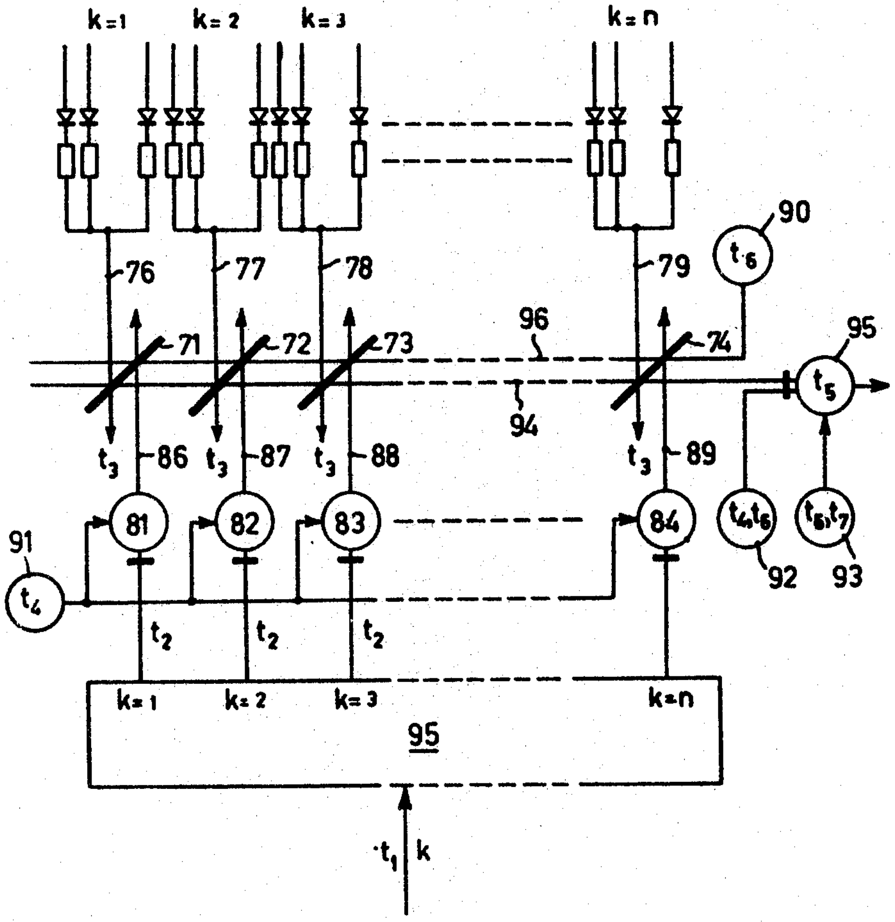

FIG. 10 shows the diagram of a possible embodiment of the checking member 35, when the check is performed in accordance with the principle illustrated in FIG. 7 for checking the state of the AB links of the network of FIG. 4. The AB-links are subdivided in this case in groups, each relating to the same value of the channel number. The AB-links of the same group are all connected via a decoupling diode and a current-determining resistor to a wire 76 and 77 . . . 79 respectively, which are threaded through a preferably annular core 71, 72 . . . 74 respectively, made from a material having a rectangular hysteresis loop. The checking member comprises furthermore a translator 95, which receives as an input information the value of the channel number $k$, which information is supplied to the translator in some code, for example, a 2-out-of-5 code, if $k$ can assume at the most 10 different values. The translator has $n$ outputs, $n$ being the number of potential values of the channel number and converts the incoming information into a 1-out-of-n-code. Each output of the translator is connected to the adjusting terminal of a storing pulse generator 81, 82 . . . 84 respectively. The output terminal of each of these pulse generators is connected to a wire 86, 87 . . . 89 respectively, which is threaded through one of the rings 71, 72 . . . 74 respectively. Thus there is each time a group of AB-links, a magnetic ring, a pulse generator and an output of the translator, which are all joined to the same value of the channel number. The firing terminals of the pulse generators 81, 82 . . . 84 are, in common, connected to a pulse source 91, which supplies a pulse at the instant $t_4$ of each pulse cycle. The checking member comprises a pulse source 90, which supplies a pulse at the instant $t_6$ of each pulse cycle, the output thereof being connected to a wire 96, which is threaded through all rings 71, 72 . . . 74 and a storing pulse generator 95, having two coupled adjusting terminals, one of which is connected to a wire 94, which is threaded through all rings 71, 72 . . . 74 and the other of which is connected to a pulse source 92, which supplies a pulse at the instants $t_4$ and $t_6$ of each pulse cycle. The firing terminals of the pulse generator 95 is connected to a pulse source 93, which supplies a pulse at the instants $t_5$ and $t_7$ of each pulse cycle. It is assumed that the translator 95 receives its input information at the instant $t_1$ of a pulse cycle and furnishes the translation of this information at the subsequent instant $t_2$, whilst the adjusting member 31 furnishes its output information at the instant $t_3$ of a pulse cycle.

The arrangement operates as follows: at the beginning of a pulse cycle all rings 71, 72 . . . 74 are in the state 0 and the pulse generators 81, 82 . . . 84 are not adjusted. The state 0 of the rings 71, 72 . . . 74 is intended to mean the state in which these rings are driven by the pulses supplied from the pulse source 90. At the instant $t_1$ the translator receives information about the value of the channel number $k$, for example $k=2$. At the instant $t_2$ the output of the translator corresponding to $k=2$ furnishes an output pulse, so that the pulse generator 82 is adjusted. At the instant $t_3$ the group of AB-links associated with $k=2$ comprise a link having marking voltage. Consequently, the wire 77 conveys a current pulse, which causes the ring 72 to change over to the state 1. At the instant $t_4$ the pulse generators 81, 82 . . . 84 are all fired, but only the pulse generator 82, being the only generator adjusted, supplies an output pulse, which changes over the ring 72 back to the state 0. The pulse thus induced into the wire 94 adjusts the pulse generator 95 in coincidence with the pulse then supplied by the pulse source 92. At the instant $t_5$ the pulse generator 95 is fired and the pulse then supplied contains the information that the group of AB-links associated with $k=2$ had at least one marked link. If this were not the case, the pulse generator 95 would not have furnished an output pulse at the instant $t_5$. It may occur, however, that also one of the further groups of AB-links had a link with marking voltage, for example the group of AB-links associated with $k=3$. In this case at the instant $t_3$ not only the ring 72 but also the ring 73 is changed over to the state 1. However, this ring is not changed back to the state 0 until the instant $t_6$ by the pulse then supplied by the pulse source 90. Thus the pulse generator 95 is adjusted by the coincidence of the pulse induced into the wire 94 and the pulse from the pulse source 92 at the instant $t_6$. At the instant $t_7$ the pulse generator 95 is fired by the clock pulse then supplied by the pulse source 93. The output pulse, thus supplied by the pulse generator 95, contains the information that also in another group of AB-links than the first-mentioned group there was a link having marking voltage.

If the AB-stage comprises a broken-down transistor, the pulse generator 95 furnishes an output pulse at the instant $t_6$ of each pulse cycle, at least if the pulse source 90 is proportioned so that the clock pulses supplied by said source cause rings 71, 72 . . . 74 to change over to the state 0 even against any direct current through the relevant wires 76, 77 . . . 79 respectively.

The arrangement does not indicate the event of a group of AB-links comprising two links having marking voltage, but such a disturbance becomes manifest in the check of the B- and C-stages and in the check in the next-following switching stage. However, the arrangement may be made suitable for distinguishing this kind of errors by using two rings for the value of the relevant co-ordinate instead of one ring and by connecting them in the manner illustrated in FIG. 9. This is particularly desirable for the checking member 35 (FIG. 7) since otherwise errors of this kind could remain unnoticed.

What is claimed is:

1. A switching network comprising a plurality of input terminals, a plurality of output terminals, a plurality of channels extending between each input terminal and each output terminal, each said channel comprising a plurality of switching stage means serially interconnected by a plurality of links between the respective input and output terminals, whereby the links of a channel have first, second and third potentials when said channel is free, being marked, and busy, respectively, means for checking the states of said links, and means connecting a plurality of said links to said checking means, said checking means comprising means responsive to the potentials on said links for separately indicating the absence of said second potential on all links connected thereto, the presence of said second potential on only one link connected thereto, and the presence of said second potential on more than one link connected thereto.

2. A switching network comprising a plurality of input terminals, a plurality of output terminals, a plurality of groups of switching means, a plurality of links interconnecting said terminals and the switching means of said groups whereby a plurality of channels extend between each input terminal and output terminal, each channel comprising a switching means of each group and a link between each pair of successive groups, means for applying first, second and third potentials to said links whereby the links of a channel have said first, second and third potentials when the respective channel is free, being marked, and busy, respectively, means for checking the states of said links, and means connecting a plurality of said links to said checking means, said checking means comprising means responsive to the potentials of said links for separately indicating the absence of said second potential on all links connected thereto, the presence of said second potential on only one link connected thereto, and the presence of said second potential on more than one link connected thereto.

3. A switching network comprising a plurality of input terminals, a plurality of output terminals, a plurality of switching matrices each comprising a plurality of switch means, a plurality of links interconnecting said terminals and said matrices whereby a plurality of channels extend between each input terminal and each output terminal, each channel comprising a separate switch means from each matrix and separate links between successive matrices, means for applying potentials to said links whereby said links have first, second and third potentials when the respective channels are free, being marked, and busy, respectively, checking means for checking the states of said links, means for connecting all of the links between only one successive pair of matrices to said checking means, said checking means comprising means responsive to the potentials of said links for separately indicating the absence of said second potential from all links connected thereto, the presence of said second potential on only one link connected thereto, and the presence of said second potential on more than one link connected thereto.

4. The network of claim 3, in which said means connecting said links to said checking means comprises a common lead, and isolating means connecting said links to said common lead, and said checking means comprises first and second cores of material having a rectangular hysteresis loop, means coupling said common lead to said cores, pulse generator means coupled to said cores, and read-out wire means coupled to said cores whereby output signals coupled to said read-out wire means are different for the three conditions when second potentials are absent on all links, are present on only one link, and are present on more than one link.

5. The network of claim 3, in which said means connecting said links to said checking means comprises a plurality of lead means and isolating means connecting each link to a lead means whereby the links corresponding to separate channels between each input terminal and output terminal are connected to separate lead means, a plurality of cores of material having a rectangular hysteresis loop, means coupling each lead means to a separate core, pulse generator means coupled to said cores, and common read-out wire means coupled to said cores whereby output signals coupled to said read-out wire means are different for the three conditions when second potentials are absent from all links, present on only one link, and present on more than one link.

6. A switching network comprising a plurality of input terminals, a plurality of output terminals, a plurality of successive groups of switching matrices, each switching matrix comprising a plurality of switch means, a plurality of links between said terminals and said groups of matrices whereby a plurality of channels extend between each input terminal and each output terminal, with each channel comprising a separate switch means from a matrix of each group and a separate link between each successive groups of matrices, means for applying potentials to said links whereby said links have first, second and third potentials when the respective channels are free, being marked, and busy, checking means for checking the states of said links, means connecting all of the links between only one pair of successive groups of matrices to said checking means, said checking means comprising means for separately indicating the absence of said second potential from all links connected thereto, the presence of said second potential on only one link connected thereto, and the presence of said second potential on more than one link connected thereto.

7. The network of claim 6, in which said means connecting said links to said checking means comprises a common lead, and isolating means connecting said links to said common lead, and said checking means comprises first and second cores of material having a rectangular hysteresis loop, means coupling said common lead to said cores, pulse generator means coupled to said cores, and read-out wire means coupled to said cores whereby output signals coupled to said read-out wire means are different from the three conditions when second potentials are absent on all links, are present on only one link, and are present on more than one link.

8. The network of claim 6, in which said means connecting said links to said checking means comprises a plurality of lead means and isolating means connecting each link to a lead means whereby the links corresponding to separate channels between each input terminal and output terminal are connected to separate lead means, a plurality of cores of material having a rectangular hysteresis loop, means coupling each lead means to a separate core, pulse generator means coupled to said cores, and common read-out wire means coupled to said cores whereby output signals coupled to said read-out wire means are different for the three conditions when second potentials are absent from all links, present on only one link, and present on more than one link.

References Cited by the Examiner

UNITED STATES PATENTS

| | | | |
|---|---|---|---|
| 2,840,801 | 6/1958 | Beter et al. | 340—166 |
| 2,913,704 | 11/1959 | Chaang Huang | 240—166 |
| 3,015,697 | 1/1962 | Klinkhammer | 340—166 X |
| 3,065,458 | 11/1962 | Lucas et al. | 340—166 |
| 3,079,588 | 2/1963 | Burstow et al. | 340—166 |
| 3,127,519 | 3/1964 | Schuringa et al. | 340—166 X |
| 3,129,293 | 4/1964 | Warman | 340—166 X |

NEIL C. READ, *Primary Examiner.*

H. I. PITTS, *Assistant Examiner.*